UNITED STATES PATENT OFFICE 2,220,086

IODIZED HYDROXY DERIVATIVES OF 2-PHENYLQUINOLINE-4-CARBOXYLIC ACID AND A METHOD OF PRODUCING THE SAME

Max Dohrn, Berlin-Charlottenburg, and Paul Diedrich, Finkenkrug, Osthavelland, Germany, assignors to Schering Corporation, Bloomfield, N. J., a corporation of New Jersey No Drawing. Application July 10, 1936, Serial No. 90,005. In Germany March 13, 1935

4 Claims. (Cl. 260—287)

This invention relates to compounds of the quinoline series and more particularly to iodized hydroxy derivatives of 2-phenylquinoline-4-carboxylic acid and a method of producing the same.

It has been found that the iodized derivatives of hydroxy derivatives of 2-phenylquinoline-4-carboxylic acid form outstanding X-ray contrast agents, above all for making the gall bladder visible. The iodized 2-(4'-hydroxy phenyl)-quinoline-4-carboxylic acids and their substitution products have shown themselves to be particularly suitable.

For the manufacture in accordance with the invention, of such derivatives the corresponding 3,5-diiodo-4-hydroxy acetophenones as are described, e. g., in application Serial No. 90,004, filed July 10, 1936 (by the treatment of 4-hydroxyacylophenones with iodinating agents, like iodine monochloride in the presence of hydrochloric acid) are condensed with isatins or preferably with iodized isatins. The condensation takes place in the ordinary way, e. g., by treatment with aqueous or alcoholic alkali metal hydroxide solutions, such as potash lye or agents which act similarly. In the case of the use of diiodo hydroxy acetophenone in which the hydroxy group is substituted by hydroxyalkyl residues, it is to be recommended to work with alcoholic potash lye. With aqueous potash lye at first an isomeric product is obtained which can only be converted by further treatment with alcoholic potash lye into the same product which is obtained by direct treatment with an alcoholic potash lye.

By 3.5-diiodo-4-hydroxy acetophenone, its homologues and their substitution products not only 3.5-diiodo-4-hydroxy acetophenone itself is to be understood but also its derivatives substituted in the hydroxy group by other residues like alkyl, alkoxy, alkylcarboxy acid, alkylsulpho acid, aryl, heterocyclic, or other residues, e. g., 3.5-diiodo-4-methoxy-acetophenone, 3.5-diiodo-4-ethoxy-acetophenone, 3.5-diiodo-acetophenone-4-hydroxymethylol ether, 3.5-diiodo-hydroxyethoxy-acetophenone, 3.5-diiodo-1-aceto-4-phenoxy acetic acid. The homologues of 3.5-diiodo-4-hydroxy acetophenone can also be employed for the condensation with iodo isatins. These are, e. g., the 3.5-diiodo-4-hydroxy-1-propiophenone, 3.5-diiodo-4-hydroxy-1-butyrophenone, 3.5-diiodo-4-hydroxy-1-(γ-hydroxybutyro-)phenone and others.

The manufacture of the substitution products can be carried out either by starting from the above named substituted acetophenone or by proceeding to the substitution of the hydroxyl group after the condensation with isatins or iodo isatins by the usual methods.

The following examples serve for illustration of the invention without, however, limiting the same to them.

Example 1

2 - (3',5' - diiodo-4'-hydroxyphenyl)-6-iodo-quinoline-4-carboxylic acid.

27.3 grams of 5-iodoisatin, 38.8 grams of 3.5-diiodo-4-hydroxyacetophenone, 60 ccs. of 33% potash lye, and 120 ccs. of alcohol are heated to boiling for 5 hours under a reflux. Then the alcohol is distilled off, the residue taken up with water and acidified with dilute hydrochloric acid. The solution again made alkaline with soda is filtered after allowing to stand for 12 hours and the product precipitated with hydrochloric acid from the filtrate is isolated and freed from any unchanged diiodo-hydroxyacetophenone by boiling with alcohol. The light brown triiodo derivative, insoluble in alcohol, is purified by reprecipitation. The substance decomposes upon heating at 215–226° C. with slow splitting off of iodine.

Example 2

2 - (3',5'-diiodo-4'-methoxy-phenyl-)-6-iodo-quinoline-4-carboxylic acid.

27.3 grams of 5-iodoisatin, 40.2 grams of 3.5-diiodo-4-methoxy acetophenone (M. P. 97–98° C.), made by treatment of the sodium salt of 3.5-diiodo-4-hydroxy-acetophenone with methyl iodide in alcoholic solution, 60 ccs. of 33% potash lye and 120 ccs. of alcohol are heated for 5 hours and worked up as described in Example 1. The light brown substance purified by reprecipitation melts with decomposition at 262° C.

Example 3

2 - (3',5' - diiodo-4'-ethoxy-phenyl-)6-iodo-quinoline-4-carboxylic acid.

27.3 grams of 5-iodo isatin and 41.6 grams of 3.5-diiodo-4-ethoxy-acetophenone (M. P. 93–94° C.) made by treatment of the sodium salt of 3.5-diiodo-4- hydroxy-acetophenone with ethyl iodide, are treated and worked up as described in Example 2. The yellow brown substance obtained decomposes at 254° C.

Example 4

2 - (3',5' - diiodo - 4'-hydroxymethylol ether-phenyl-)6-iodo-quinoline-4-carboxylic acid.

27.3 grams of 5-iodoisatin, 43.2 grams of 3.5- diiodo - acetophenone-4-hydroxymethylol ether (needles of M. P. 96–97° C.) made by treatment of the sodium salt of 3.5-diiodo-4-hydroxy-acetophenone with chloromethyl ether in solution in benzene, 60 ccs. of 33% potash lye and 120 ccs. of alcohol are heated for 5 hours and worked up in customary way. 58 grams of a substance decomposing at 234° C. light brown in color and insoluble in alcohol are obtained.

Example 5

The condensation product of 5-iodoisatin and 3.5-diiodo-4-hydroxyethoxy-acetophenone.

27.3 grams of 5-iodoisatin, 43.2 grams of 3.5-diiodo-4-hydroxyethoxy-acetophenone (M. P. 85–90° C.) made by treatment of the sodium salt of 3.5-diiodo-4-hydroxy acetophenone with ethylene chlorohydrin, 60 ccs. of 33% potash lye and 120 ccs. of alcohol, are heated and worked up in the way described. The raw product obtained is purified by precipitation and boiled with alcohol. The light brown substance decomposes on heating at about 242° C. The yield according to this process amounts to 35%.

An important increase in yield is obtained if the condensation is carried out in two stages as described in the following:

27.3 grams of 5-iodoisatin and 43.2 grams of 3.5-diiodo-4-hydroxyethoxy-acetophenone are heated to boiling for about an hour with 30 ccs. of 33% potash lye and 100 ccs. of water, and the reaction mixture diluted with alcohol and precipitated in the hot with dilute hydrochloric acid. The intermediate product obtained isomeric with the end product decomposes at about 270° C. It is, for the purpose of conversion into the valuable end product, heated to boiling with 60 ccs. of 33% potash lye and 120 ccs. of alcohol for 5 hours and worked up according to the process described above. The light brown end product decomposes at the same temperature of 242–245° C. as does the product obtained in the above-described single stage process.

The reaction involves both condensation and rearrangement, as shown by the following equation:

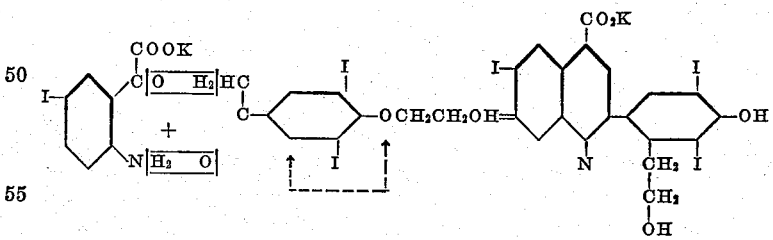

(cf. "Fries'sche Umlagerung" Ber. d. D. Ch. Ges. 43, page 215, footnote and Annalen d. Ch. 460, page 88).

Example 6

2-(3′.5′-diiodo-4′-hydroxyphenyl-)6-iodo-3-(β-hydroxy-ethyl)-quinoline-4-carboxylic acid.

27.3 grams of 5-iodoisatin, 43.2 grams of 3.5-diiodo - 4 -hydroxy-1-(γ-hydroxybutyro)phenone of M. P. 106° C. obtained by iodising 4-hydroxy-1-(γ-hydroxybutyro-)phenone of M. P. 144° C. which is made by treatment of γ-bromobutyrophenol of B. P. 173–175° C. at 15 mm. pressure with aluminium chloride, 65 ccs. of 33% potash lye and 130 ccs. of water are heated to boiling for 3 hours. The precipitate then obtained by acidification is taken up in dilute soda solution and the filtered solution is again acidified whereby the triiodo derivative is separated. After filtration with suction and washing with water it is boiled with alcohol for the removal of unchanged ketone. After repeated reprecipitation it decomposes upon heating at 244–245° C. The yield amounts to 45 grams, that is 65.5% of the theoretical yield.

Example 7

(6′-iodo-4′-carboxy - quinonyl-2-)3.5-diiodo-4-phenoxy-acetic acid.

27.3 grams of 5-iodoisatin, 42 grams of 33% potash lye (2.6 mol) and 30 ccs. of water are heated to boiling and a solution of 44.6 grams of 3.5-diiodo-1-aceto-4-phenoxyacetic acid in 100 ccs. of 1 n. potash lye is added. After short boiling the condensation is complete. The solution is diluted with 500 ccs. of water, acidified with hydrochloric acid in the hot and the voluminous orange yellow precipitate is dried after washing. The substance which already is analytically pure decomposes on heating at 260° C. with splitting off of iodine. The yield is quantitative. The product is sparingly soluble in hot water, better in hot alcohol and glacial acetic acid.

Example 8

(4′-carboxy - quinonyl - 2′-)3.5 - diiodo-4-phenoxyacetic acid.

14.7 grams of isatine, 44.6 grams of 3.5-diiodo-1-aceto-4-phenoxyacetic acid and 350 ccs. of 1 n. potash lye are heated to boiling for some time. The solution is considerably diluted with water and acidified with hydrochloric acid at 30° C. The precipitate is again dissolved in dilute soda solution, filtered and again precipitated with hydrochloric acid. Recrystallised from alcohol with animal charcoal, the acid forms colorless microscopic prisma of M. P. 266–267° C. with decomposition.

Example 9

2-(3′.5′-diiodo - 4′-ethoxy - phenyl-)6-methyl-quinoline-4-carboxylic acid.

16.1 grams of 5-methyl isatin (M. P. 184°), 41.6 grams of 3.5-diiodo-4-ethoxyacetophenone, 60 ccs. of 33% potash lye and 120 ccs. of alcohol are heated for 5 hours and the solution worked up as described in Example 2. The raw acid obtained may be purified by recrystallisation from glacial acetic acid or nitro-benzene. The light brown amorphous product decomposes on heating at 245° C.

The reaction conditions, temperatures, solvents, condensation agents, concentrations, and the like given in the examples can be varied within certain limits corresponding to the chemical characters and properties of the reaction components.

What we claim is:

1. A method for the production of derivatives of 2-(3′.5′-diiodo-phenyl-6-iodo-quinoline-4-carboxylic acid, which comprises condensing 5-iodoisatin and 3.5-diiodo-4-hydroxy ethoxy acetophenone by heating said compounds in alcoholic alkali metal hydroxide solution and isolating the isomerized condensation product from the condensation mixture.

2. A method for the production of derivatives of 2-(3'.5'-diiodo-phenyl-6-iodo-quinoline-4-carboxylic acid, which comprises condensing 5-iodoisatin and 3.5-diiodo-4-hydroxy ethoxy acetophenone by heating said compounds in aqueous alkali metal hydroxide solution, rearranging the condensation product obtained thereby by heating with alcoholic alkali metal hydroxide solution and isolating the isomerized condensation product.

3. A 2-(3'.5'-diiodo-phenyl)-quinoline-4-carboxylic acid compound corresponding to the product obtained by condensing, in an alcoholic alkaline medium,

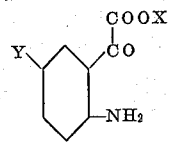

with

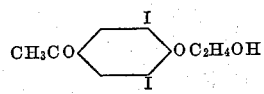

until condensation and isomerization have taken place, wherein X represents a cation of the group consisting of hydrogen and metals, Y a member of the group consisting of hydrogen and iodine.

4. A 2-(3'.5'-diiodo-phenyl)-quinoline-4-carboxylic acid compound corresponding to the product obtained by condensing, in an alcoholic alkaline medium,

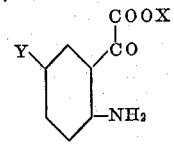

with

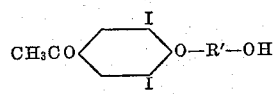

until condensation and isomerization have taken place, wherein X represents a cation of the group consisting of hydrogen and metals, Y a member of the group consisting of hydrogen and iodine, and R' a lower alkylene hydrocarbon radical.

MAX DOHRN.
PAUL DIEDRICH.